US010350671B2

(12) United States Patent
Tamura et al.

(10) Patent No.: US 10,350,671 B2
(45) Date of Patent: Jul. 16, 2019

(54) METHOD FOR PRODUCING A FORGED CRANKSHAFT

(71) Applicant: NIPPON STEEL & SUMITOMO METAL CORPORATION, Tokyo (JP)

(72) Inventors: Kenji Tamura, Takatsuki (JP); Junichi Okubo, Amagasaki (JP); Koichiro Ishihara, Kyoto (JP); Ken Yoshino, Guangdong (CN); Kunihiro Yabuno, Matsubara (JP); Hiroyuki Kurokawa, Nishinomiya (JP); Tomohisa Yamashita, Suita (JP); Sho Takamoto, Osaka (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 198 days.

(21) Appl. No.: 15/325,101

(22) PCT Filed: Jul. 9, 2015

(86) PCT No.: PCT/JP2015/003452
§ 371 (c)(1),
(2) Date: Jan. 10, 2017

(87) PCT Pub. No.: WO2016/009620
PCT Pub. Date: Jan. 21, 2016

(65) Prior Publication Data
US 2017/0189955 A1    Jul. 6, 2017

(30) Foreign Application Priority Data

Jul. 14, 2014  (JP) .................. 2014-144338

(51) Int. Cl.
*B21J 5/02* (2006.01)
*B21K 1/08* (2006.01)
*F16C 3/08* (2006.01)

(52) U.S. Cl.
CPC .................. *B21K 1/08* (2013.01); *B21J 5/02* (2013.01); *B21J 5/027* (2013.01); *F16C 3/08* (2013.01); *F16C 2220/46* (2013.01)

(58) Field of Classification Search
CPC ..... B21K 1/08; B21J 5/027; B21J 5/02; F16C 3/08; F16C 2220/46
See application file for complete search history.

(56) References Cited

U.S. PATENT DOCUMENTS 4,094,048 A  *  6/1978  Broder ................. B21K 1/08
29/888.08

FOREIGN PATENT DOCUMENTS

JP   2008-155275   7/2008
JP   2010-230027   10/2010
(Continued)

*Primary Examiner* — Christopher J Besler
*Assistant Examiner* — Christine Pellazar Bersabal
(74) *Attorney, Agent, or Firm* — Clark & Brody (57) ABSTRACT

A method for producing a forged crankshaft includes: a preforming step of forming a preformed blank with no flash, the preformed blank including a shape of the crankshaft, wherein the crank arm have excess projecting portions at an outer peripheries of side portions of the crank arm near the crank pin; a die forging step of forming a forged blank with flash by pressing the preformed blank with a pair of first dies; and a trimming step of removing the flash from the forged blank. In the die forging step, while a second die is abutted against a journal-side surface of the crank arm and holds the surface, the excess projecting portions of the crank arm are deformed by the first dies so as to increase the side portions of the crank arm in thickness.

8 Claims, 4 Drawing Sheets

(56) References Cited

FOREIGN PATENT DOCUMENTS

| | | |
|---|---|---|
| JP | 2011-161496 | 8/2011 |
| JP | 2012-007726 | 1/2012 |

* cited by examiner

METHOD FOR PRODUCING A FORGED CRANKSHAFT

TECHNICAL FIELD

The present invention relates to a method for producing a crankshaft by hot forging.

BACKGROUND ART

Reciprocating engines for motor vehicles, motorcycles, agricultural machines, marine vessels and the like require a crankshaft to extract power by converting reciprocating motion of pistons to rotary motion. Crankshafts are generally categorized into two types: those of the type produced by die forging and those of the type produced by casting. In particular, in cases where high strength and high stiffness are required, the firstly mentioned forged crankshafts, which are superior in those properties, are often employed.

In general, forged crankshafts are produced by using, as a starting material, a billet having a circular or square cross section and having a constant cross-sectional area along the entire length. In a production process of a forged crankshaft, the billet is subjected to the steps of preforming, die forging, trimming and coining in order. Typically, the preforming step includes the steps of roll forming and bending, and the die forging step includes the steps of block forging and finish forging.

FIGS. 1(a)-1(f) are views schematically illustrating a typical conventional process for producing a forged crankshaft. A crankshaft 1 illustrated in FIG. 1(f) is intended to be mounted in a 4-cylinder engine, and is a 4-cylinder 8-counterweight crankshaft. The crankshaft 1 includes: five journals J1 to J5; four crank pins P1 to P4; a front part Fr; a flange Fl; and eight crank arms (hereinafter referred to simply as "arms") A1 to A8 that connect the journals J1 to J5 and the crank pins P1 to P4 to each other. The eight crank arms A1 to A8 have counterweights (hereinafter referred to simply as "weights") W1 to W8, respectively. The weights W1 to W8 are integrally formed with the arms A1 to A8, respectively.

In the following paragraphs, when the journals J1 to J5, the crank pins P1 to P4, the arms A1 to A8, and the weights W1 to W8 are each collectively referred to, a reference character "J" is used for the journals, a reference character "P" for the crank pins, a reference character "A" for the arms, and a reference character "W" for the weights. Also, a crank pin P and a pair of arms A (including weights W) which connects with the crank pin P are collectively referred to as a "throw".

According to the production method shown in FIG. 1, the forged crankshaft 1 is produced in the following manner. First, a billet 2 shown in FIG. 1(a), which has been previously cut to a predetermined length, is heated by a heating furnace (for example, an induction heater or a gas atmosphere furnace) and then is subjected to roll forming. In the roll forming step, the billet 2 is rolled and reduced in cross section by grooved rolls, for example, to distribute its volume in the longitudinal direction, whereby a rolled blank 3, which is an intermediate material, is formed (see FIG. 1(b)). In the bending step, the rolled blank 3 obtained by roll forming is partially pressed in a direction perpendicular to the longitudinal direction to distribute its volume, whereby a bent blank 4, which is a secondary intermediate material, is formed (see FIG. 1(c)).

Then, in the block forging step, the bent blank 4 obtained by bending is press forged with a pair of upper and lower dies, whereby a forged blank 5 having a general shape of a crankshaft (end product) is formed (see FIG. 1(d)). Then, in the finish forging step, the block forged blank 5 obtained by block forging is further press forged with a pair of upper and lower dies, whereby a forged blank 6 having a shape in agreement with the shape of the crankshaft (end product) is formed (see FIG. 1(e)). In the block forging and the finish forging, excess material flows out from between the mutually opposed parting surfaces of the dies, thereby forming flash. Thus, the block forged blank 5 and the finish forged blank 6 have large flash (5a, 6a) around the shape of the crankshaft.

In the trimming step, the finish forged blank 6 with the flash 6a, obtained by finish forging, is held by dies from above and below, and the flash 6a is removed by a cutting die. In this manner, the forged crankshaft 1 is obtained as shown in FIG. 1(f). In the coining step, principal parts of the forged crankshaft 1, from which the flash has been removed, are slightly pressed with dies from above and below and corrected to the size and shape of the end product. In this regard, the principal parts of the forged crankshaft 1 are, e.g., shaft parts such as the journals J, the crank pins P, the front part Fr and the flange Fl, and in some cases the arms A and the weights W. In this manner, the forged crankshaft 1 is produced.

The production process shown in FIGS. 1(a) to 1(f) is applicable not only for producing a 4-cylinder 8-counterweight crankshaft as illustrated in FIG. 1(f) but also for producing various other types of crankshafts. For example, the production process is applicable for producing a 4-cylinder 4-counterweight crankshaft. In a 4-cylinder 4-counterweight crankshaft, some of the eight arms A have weights W. For example, among the eight arms A, the leading first arm A1, the trailing eighth arm A8, and the two central arms (the fourth arm A4 and the fifth arm A5) have weights W. Also, the same production process can be applied for producing crankshafts that are to be mounted in a 3-cylinder engine, an inline 6-cylinder engine, a V-type 6-cylinder engine, an 8-cylinder engine, and the like. It is noted that, when adjustment of the placement angle of the crank pins is necessary, a twisting step is added after the trimming step.

In recent years, there has been a need for weight reduction of reciprocating engines, particularly those for motor vehicles, in order to improve the fuel economy. Accordingly, there is also an ever-increasing demand for weight reduction of crankshafts, which are a principal component of a reciprocating engine. Conventional techniques intended for weight reduction of a forged crankshaft include the following.

Patent Literatures 1 and 2 each disclose an arm having a hollow portion in the journal-side surface of the arm, and disclose a method for producing a crankshaft having the arm. The hollow portion in the arm is positioned on a line connecting the axis of the journal and the axis of the crank pin (the line hereinafter being referred to as an "arm centerline"), and the hollow portion is depressed greatly and deeply toward the crank pin. The arm is reduced in weight by an amount corresponding to the volume of the hollow portion. The weight reduction of the arm leads to weight reduction of the counterweight, which forms a pair with the arm, and this in turn leads to weight reduction of the forged crankshaft as a whole. Furthermore, each of the arms disclosed in Patent Literatures 1 and 2 has sufficient stiffness (torsional rigidity and flexural rigidity) because the side portions near the crank pin, between which the arm centerline is interposed, have a large thickness.

By providing a recess in the journal-side surface of the arm while ensuring a large thickness at the side portions of the arm as described above, it is possible to achieve weight reduction in combination with sufficient stiffness.

However, forged crankshafts having such a unique shape are difficult to produce using conventional production methods. The reason is that, when the recess in the surface of the arm is to be formed in the die forging step, a situation will occur in which the draft of the die becomes a reverse draft at the site of the recess and therefore the formed forged blank cannot be removed from the die.

To address such a situation, the production methods disclosed in Patent Literatures 1 and 2 are configured as follows: in the die forging step, the arm is shaped to be small with no recess formed in the surface of the arm, and after the trimming step, a punch is pressed into the surface of the arm so that the mark made by the punch forms the recess.

In the meantime, by the production process illustrated in FIGS. 1(a) to 1(f), unnecessary large flash, which is not a part of an end product, is generated, thereby leading to yield reduction. Thus, in the technology for manufacture of forged crankshafts, improving the yield by suppressing flash has been an object. Conventional techniques intended to attain this object include the followings.

For example, Patent Literature 3 discloses a technique for producing a crankshaft comprising shaped journals and crank pins, and roughly shaped arms. According to the technique, the used as a blank is a stepped round bar having reduced diameter regions at portions to be formed into journals and crank pins of a crankshaft, and portions to be formed into a pair of journals between which a crank pin intervenes are held with dies.

In this state, the dies are axially moved closer to each other to compressively deform the round bar blank, and a punch is applied to the portion to be formed into a crank pin in a direction perpendicular to the axial direction, whereby the portion to be formed into a crank pin is pressed into an eccentric position. This operation for pressing the portion to be formed into a crank pin into an eccentric position is repeated in succession for all crank throws. In this way, the journals and the crank pins are shaped, and the arms are roughly shaped.

Also, Patent Literature 4 discloses a technique for producing a crankshaft comprising shaped journals and crank pins, and roughly shaped arms. According to the technique, the used as a blank is a simple round bar. One of the two ends of the round bar is held with a stationary die, and the other end thereof is held with a movable die. Also, portions to be formed into journals are held with journal dies, and portions to be formed into crank pins are held with crank pin dies.

In this state, the movable die, the journal dies and the crank pin dies are axially moved toward the stationary die to compressively deform the round bar blank. At the same time, the crank pin dies are moved in an eccentric direction perpendicular to the axial direction to press the portions to be formed into the crank pins into eccentric positions. In this way, the journals and the crank pins are shaped, and the arms are roughly shaped.

With both the techniques disclosed in Patent Literatures 3 and 4, no flash is generated, and therefore, a significant improvement in yield can be expected.

CITATION LIST

Patent Literature

Patent Literature 1: Japanese Patent Application Publication No. 2012-7726

Patent Literature 2: Japanese Patent Application Publication No. 2010-230027

Patent Literature 3: Japanese Patent Application Publication No. 2008-155275

Patent Literature 4: Japanese Patent Application Publication No. 2011-161496

SUMMARY OF INVENTION

Technical Problem

With the techniques disclosed in Patent Literatures 1 and 2, it is possible to make a recess in the journal-side surface of an arm while keeping the both side portions of the arm thick. Thereby, it is possible to produce a forged crankshaft having a reduced weight and sufficient stiffness.

According to these techniques, however, a punch is applied to the surface of the arm to deform the whole arm, thereby making a recess in the surface of the arm, and a great force is needed for the application of a punch. Therefore, a special mechanism for exerting a force for the application of a punch is required, and maintenance of the punching performance must be considered.

With both the techniques disclosed in Patent Literatures 3 and 4, no flash is generated, and therefore a significant improvement in yield can be expected. However, neither of these documents discusses weight reduction of a forged crankshaft, and these techniques do not meet the need for weight reduction.

It is an object of the present invention to provide a method for producing a forged crankshaft that allows for a simple and higher-yield production process of a forged crankshaft having reduced weight and sufficient stiffness.

Solution to Problem

A production method of a forged crankshaft according to an embodiment of the present invention is a method for producing a forged crankshaft which includes: journals that define a center of rotation; crank pins that are eccentric with respect to the journals; and crank arms, each of the crank arms connecting a corresponding one of the journals to a corresponding one of the crank pins. The production method includes: a preforming step of forming a preformed blank with no flash, the preformed blank including a shape of the crankshaft, wherein the crank arm has an excess projecting portion at an outer periphery of each of side portions near the crank pin, the excess projecting portion projecting from the outer periphery; a die forging step of forming a forged blank with flash by pressing the preformed blank formed in the preforming step with a pair of first dies; and a trimming step of removing the flash from the forged blank formed in the die forging step. In the die forging step, while a second die is abutted against an area in a surface of the crank arm to hold the area, the surface being adjacent to the journal, the area not including areas of the side portions, by the first dies the excess projecting portions of the crank arm are deformed so as to increase the side portions of the crank arm in thickness.

In the production method, the second die preferably has a guide groove so that excess material flowing out to be formed into the flash during the pressing in the die forging step is guided through the guide groove.

In the production method, during the pressing in the die forging step, the second die is preferably moved in a pressing direction such that the second die is positioned in a center of a space between the paired first dies.

Advantageous Effects of Invention

According to the present invention, in the preforming step, excess projecting portions protruding locally from outer peripheries of side portions of the arm are formed, and in the die forging step, the excess projecting portions are deformed by the first dies to increase the side portions in thickness. Thereby, it is possible to form a recess in the journal-side surface of the arm while keeping the side portions of the arm thick. Accordingly, this allows for production of a forged crankshaft having reduced weight and sufficient stiffness.

In the die forging step, the second die is abutted against the journal-side surface of the arm except at least the both side portions and holds the journal-side surface. Using the second die prevents problems that may be accompanied with the die forging and allows for a simple process requiring no large force for formation of the recess in the arm. Also, the preformed blank to be subjected to the die forging step already has the shape of the crankshaft and has no flash, which leads to suppression of formation of flash in the die forging step and an improvement in yield.

DESCRIPTION OF EMBODIMENTS

A method for producing a forged crankshaft according to the present invention will hereinafter be described with reference to the drawings.

The method for producing a forged crankshaft according to the present embodiment includes a preforming step, a die forging step and a trimming step. All of the preforming step, the die forming step and the trimming step are hot working.

1. Shape of Arms of Crankshaft

FIGS. 2(a) to 2(f) are schematic views showing an example of the shape of an arm of a crankshaft before subjected to forging according to the present invention, FIG. 2(a) being a perspective view, FIG. 2(b) being a front view seen from the side of a journal, FIG. 2(c) being a top view, and FIG. 2(d) being a sectional view along the line A-A.

FIGS. 3(a) to 3(d) are schematic views showing an example of the shape of the arm of the crankshaft after subjected to forging according to the present invention, FIG. 3(a) being a perspective view, FIG. 3(b) being a front view seen from the side of a journal, FIG. 3(c) being a top view, and FIG. 3(d) being a sectional view along the line B-B.

In FIGS. 2(a) to 2(d) and FIGS. 3(a) to 3(d), one arm (including a weight) is illustrated as an example typical of the arms of the crankshaft, and the other arms are not illustrated.

With regard to the arm A after subjected to forging according to the present embodiment, as illustrated in FIGS. 3(a) to 3(d), both sides bulge out toward the journal J at portions (Aa, Ab) near the crank pin P, and accordingly, the both side portions (Aa, Ab) are thicker. The arm A has a recess in the surface on the side of the journal J, in an inner area As that is inward of the both side portions (Aa, Ab). The side portions (Aa, Ab) of the arm A mean side surfaces of the arm A and portions therearound. In other words, the side portions (Aa, Ab) of the arm A mean end portions in the width direction of the arm A (in a direction perpendicular to a plane including the axis of the journal J and the axis of the crank pin P).

Thus, the arm A after subjected to forging has thick side portions (Aa, Ab) and a recess in the journal J-side surface. This shape of the arm A is maintained after the trimming step. According to the present embodiment, the recess formed in the surface of the arm A allows for weight reduction of the forged crankshaft. Moreover, the thick side portions (Aa, Ab) of the arm A allow for ensuring of sufficient stiffness of the forged crankshaft.

On the other hand, the arm A before subjected to forging, as illustrated in FIGS. 2(a) to 2(d), has a recess in the journal J-side surface, in the inner area As that is inward of the both side portions (Aa, Ab). The recess agrees with the recess in the arm after subjected to forging (the arm of the end product) and extends smoothly to the both side portions (Aa, Ab) of the arm A. Accordingly, the both side portions (Aa, Ab) of the arm A before subjected to forging are thinner than those after subjected to forging (of the end product).

On the outside of the side portions (Aa, Ab) of the arm A, excess projecting portions (Aaa, Aba) are formed. The excess projecting portions (Aaa, Aba) project from the outer peripheries (side surfaces) of the side portions (Aa, Ab). The excess projecting portions (Aa, Ab) shown in FIGS. 2(a) to 2(d) are plate-like portions extending in the width direction and stretching along the outer peripheries of the side portions (Aa, Ab). The excess projecting portions (Aaa, Aba) have thicknesses nearly equal to or less than those of the side portions (Aa, Ab) at the base thereof.

2. Method for Producing Forged Crankshaft

According to the present embodiment, as mentioned above, the method for producing a forged crankshaft includes the preforming step, the die forging step and the trimming step, which are hot working steps to be sequentially carried out. When adjustment of the placement angle of the crank pins is necessary, a twisting step is carried out after the trimming step.

In the preforming step, a billet used as a starting material is subjected to preforming, whereby a preformed blank having a general shape of a crankshaft (end product) is formed. The preformed blank, which is an intermediate product, has an excess volume so that the preformed blank can be subjected to finish forging, which is accompanied with formation of flash, in the die forging step.

The preforming step includes, for example, the steps of rolling and multiple bending (commonly so-called, "preforming"). In the rolling step, from the billet that is a starting material, a rolled blank that is an intermediate material is formed. In the rolling step, the billet is subjected to roll forming using grooved rolls, whereby the volume of the billet is distributed in the longitudinal direction. In the subsequent bending step, the rolled blank is partially pressed in a direction perpendicular to the longitudinal direction, whereby the volume of the rolled blank is further distributed. By applying such bending to the rolled blank repeatedly, a preformed blank having the above-mentioned shape can be formed.

In the preforming step, the technique disclosed in Patent Literature 3 or 4 may be used to form the preformed blank. Alternatively, cross rolling or full-enclosed die forging may be adopted.

Figure 2:
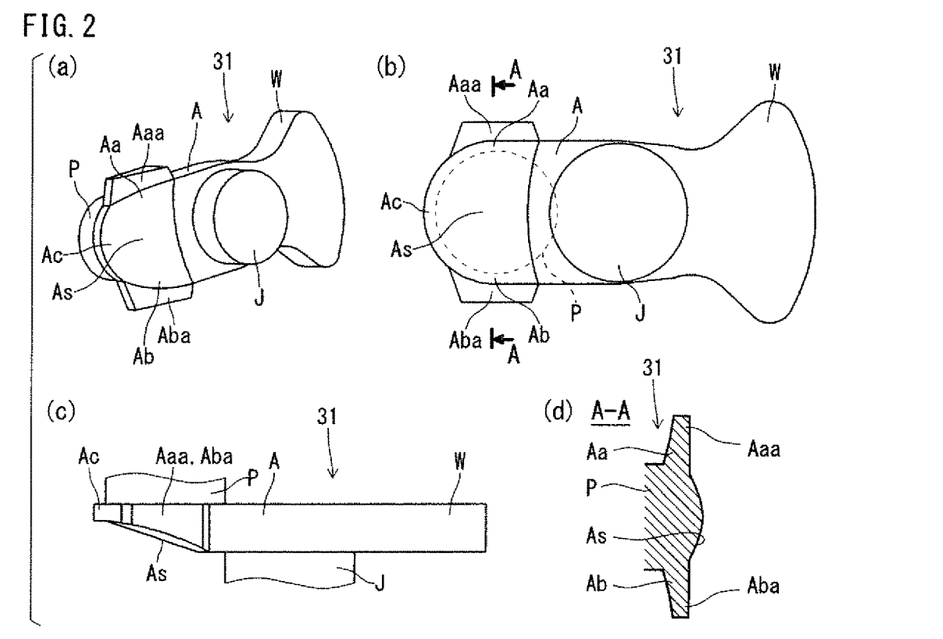
FIGS. 2(a) to 2(d) are views schematically showing an example of the shape of an arm of a crankshaft before subjected to forging according to the present invention, FIG. 2(a) being a perspective view, FIG. 2(b) being a front view seen from the side of a journal, FIG. 2(c) being a top view, and FIG. 2(d) being a sectional view along the line A-A.

Thus, the preformed blank obtained in the preforming step has the general shape of the crankshaft (end product) as illustrated in FIG. 2. The preform blank obtained in the preforming step has excess projecting portions (Aaa, Aba) formed around the arm, and a recess formed in the journal J-side surface of the arm. As described above, the excess projecting portions (Aaa, Aba) are provided along the outer peripheries of the side portions (Aa, Ab) of the arm, in the part of the arm near the crank pin P, so as to project from the outer peripheries. The recess is formed in the journal J-side surface of the arm, in the inner area As inward from the side portions (Aa, Ab), and the shape of the recess agrees with that after forging (that of the end product). Further, the preformed blank has no flash.

For the formation of a preformed blank in the preforming step, a mold tool, such as a punch, dies or the like, is used. The mold tool has an impression that reflects the shape of the arm A, specifically, the shapes of the excess projecting portions and the recess in the area As. In any of the portions corresponding to the excess projecting portions (Aaa, Aba) along the outer peripheries of the arm and the portion corresponding to the recess in the surface of the arm, the draft of the die is never a reverse draft. Accordingly, the formation of a preformed blank can be done with no problem.

Next, the process goes to the die forging step. In the die forging step, as in a typical conventional die forging step (more specifically, a block forging step and a finish forging step), a pair of first dies is used. In the production method according to the present embodiment, additionally, a second die is used.

FIGS. 4(a) to 4(c) are front views schematically illustrating an example of movements of the dies in the die forging step according to the present invention. FIG. 4(a) shows an early stage of the die forging step, FIG. 4(b) shows an intermediate stage of the die forging step, and FIG. 4(c) shows a final stage of the die forging step. FIGS. 4(a) to 4(c) show a preformed blank (31, 32), a pair of upper and lower first dies 10, and a second die 20.

Figure 5:
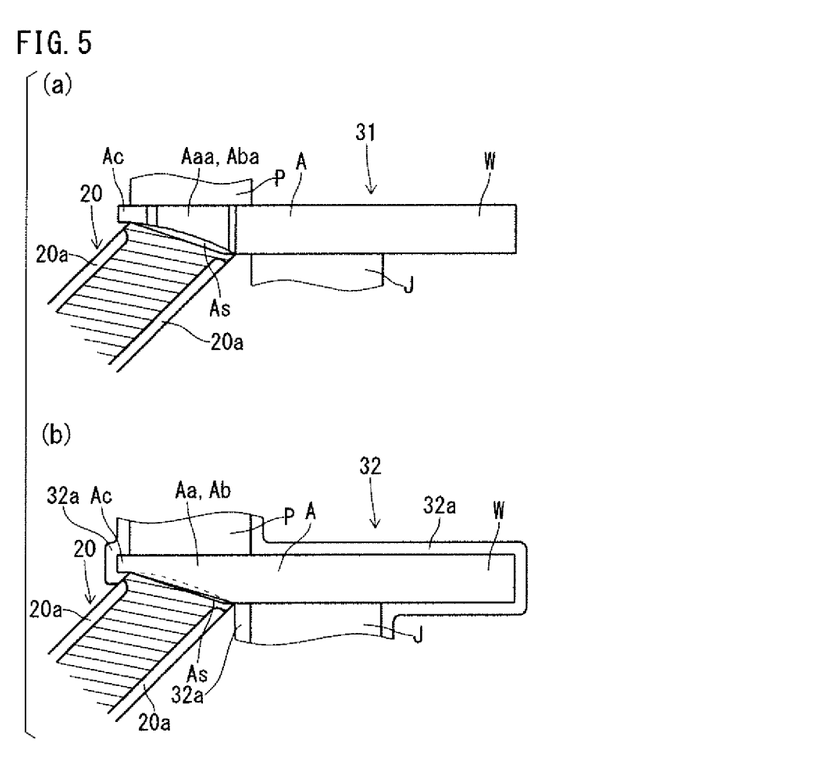
FIGS. 5(a) and 5(b) are top views schematically showing an example of arrangement of a second die in the die forging step according to the present invention, FIG. 5(a) showing an early stage of the die forging step, and FIG. 5(b) showing a final stage of the die forging.

FIGS. 5(a) and 5(b) are top views schematically illustrating an example of arrangement of the second die in the die forging step according to the present invention. FIG. 5(a) shows an early stage of the die forging step, and FIG. 5(b) shows a final stage of the die forging step. FIGS. 5(a) and 5(b) show the preformed blank (31, 32) and the second die 20. In FIGS. 5(a) and 5(b), for the sake of simplicity of the drawings, the pair of first dies is not shown, and the second die 20 is shown in section along the center plane of the arm.

The upper die 11 and the lower die 12 of the first dies 10 have impressions. The impressions reflect the shape of the crankshaft illustrated in FIG. 3, except the recess in the area As of the arm A. Specifically, the impressions reflect the shapes of the journal J and the crank pin P. Also, the impressions reflect the shape of the arm A, except the recess in the area As.

The upper die 11 and the lower die 12 of the first dies 10 are widely open at the sites corresponding to the recess in the area As of the arm A so that the second die 20 is accommodated at the open sites.

The second die 20 has an impression. The impression reflects the shape of the journal J-side surface of the arm A, except at least the side portions (Aa, Ab). The impression of the second die 20 illustrated in FIGS. 4(a) to 4(c) reflect the shape of the recess in the area As of the arm A.

The second die 20 is movable forward and backward to come in contact with and separate from the journal J-side surface of the arm. This movement of the second die 20 is effected by operation of a hydraulic cylinder or the like connected to the second die 20.

Figure 4:
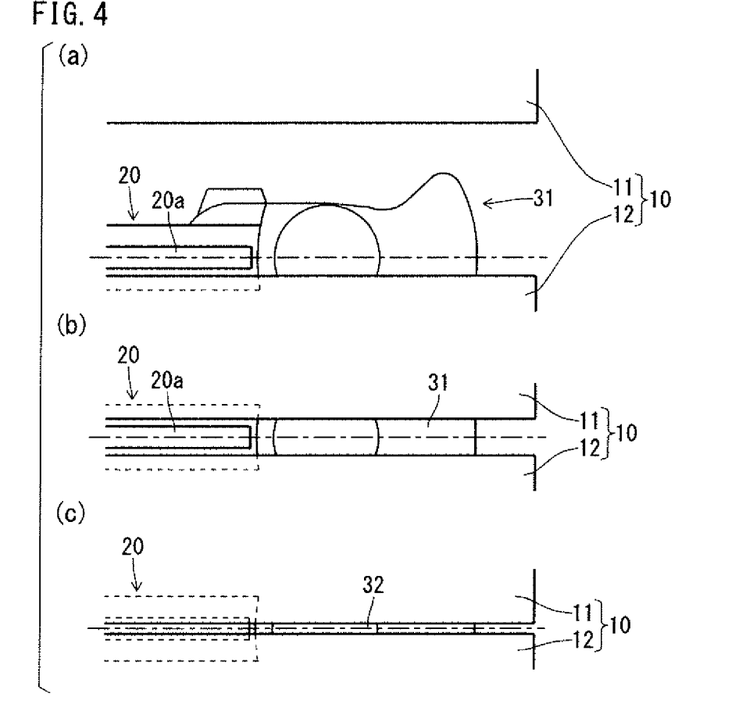
FIGS. 4(a) to 4(c) are front views schematically illustrating an example of movements of dies in a die forging step according to the present invention, FIG. 4(a) showing an early stage of the die forging step, FIG. 4(b) showing an intermediate stage of the die forging step, and FIG. 4(c) showing a final stage of the die forging step.

Also, the second die 20 illustrated in FIGS. 4(a) to 4(c) is movable in a pressing direction (vertical direction in FIG. 4) so as to be positioned in the center of a space between the upper die 10 and the lower die 12 of the first dies 10. A mechanism for this movement of the second die 20 may include, for example, a holder (not shown in the drawings) holding the second die 20, a first elastic component (e.g., a spring, not shown in the drawings), and a second elastic component (e.g., a spring, not shown in the drawings). The first elastic component connects the lower die 12 and the holder, and the holder connected to the lower die 12 is movable in the vertical direction. A first end of the second elastic component is connected to the upper die 11, and a second end thereof is capable of coming in contact with the holder.

In this case, in an initial state, the upper die 11 and the lower die 12 are separate from each other enough to keep the second end of the second elastic component away from the holder. Accordingly, even when the upper die 11 and the lower die 12 come closer to each other, it is possible to maintain a certain distance between the holder and the lower die 12. The upper die 11 and the lower die 12 come still closer to each other, and when the second die 20 is positioned in the center of the space between the upper die 11 and the lower die 12, the second end of the second elastic component comes in contact with the holder. When the upper die 11 and the lower die 12 furthermore come closer to each other, the first elastic component and the second elastic component start compressing, and along with the compression of the first and the second elastic components, the second die 20 moves down together with the holder. The first elastic component and the second elastic component are adjusted to compress by the same amount in this moment, and the second die 20 moves down while keeping its position in the center of the space between the upper die 10 and the lower die 12.

The die forging step by use of the first dies 10 and the second die 20 are carried out as follows. First, while the upper die 11 and the lower die 12 of the first dies 10 are sufficiently separate from each other, the preformed blank is placed in the impression of the lower die 12. In this moment, the second die 20 is away from the preformed blank 31, and the recess in the journal J-side surface (area As) of the arm A is not held.

Next, the second die 20 is moved forward to abut against the recess in the area As of the arm A as illustrated in FIGS. 4(a) and 5(a). Thereby, the shape of the recess in the area As of the arm A is retained by the second die 20. In this moment, the position of the second die 20 in the pressing direction is not in the center of the space between the paired first dies 10 but at a specified distance from the lower die 12.

In this state, the upper die 11 is moved toward the lower die 12. In the meantime, since the upper die 11 and the lower die 12 are sufficiently separate from each other, the position of the second die 20 in the pressing direction (vertical direction) is kept at the specified distance from the lower die 12. More specifically, in a case of adopting the above-described mechanism including the holder, the first elastic component and the second elastic component, the second elastic component does not come in contact with the second die 20, and therefore, the second die 20 is kept in the same position in the pressing direction. The upper die 11 is moved further until the position of the second die 20 in the pressing direction becomes the center of the space between the paired first dies 10, and then, the positions of the first dies 10 and the second die 20 become as shown in FIG. 4(b).

By moving the upper die 11 further toward the lower die 12 from the position shown in FIG. 4(b), the second die 20 is caused to start moving in the pressing direction to keep its position in the center of the space between the paired first dies 10. More specifically, in a case of adopting the above-described mechanism including the holder, the first elastic component and the second elastic component, the second elastic component comes in contact with the second die 20, and both of the first elastic component and the second elastic component start compressing. Along with the compression, the second die 20 moves down. Since the first elastic component and the second elastic component are adjusted so as to compress by the same amount for the downward movement of the second die 20, the second die 20 moves down while keeping its position in the center of the space between the paired first dies 10. Almost at the same time with the start of the movement of the second die 20 in the pressing direction, the first dies 10 start pressing the preformed blank 31.

The upper die 11 is moved further to arrive at a pressing end position (see FIG. 4(c)). In the meantime, along with the movement of the upper die 11, the second die 20 moves to keep its position substantially in the center of the space between the paired first dies 10. When the upper die 11 arrives at the pressing end position, the pressing of the preformed blank 31 is completed.

In the process from the start of pressing to the end of pressing, the preformed blank is pressed by the first dies 10 and is formed into the shape corresponding to the impressions of the upper die 11 and the lower die 12. For example, the journals J and the crank pins P are formed on the preformed blank. This formation along with the pressing is accompanied by formation of flash 32a around the preformed blank.

In the process of pressing, the second die 20 is abutted against the recess in the area As of the arm A. Thus, the shape of the recess in the area As of the arm A is maintained by the second die 20. It is preferred that the second die 20 is movable in the vertical direction, for example, by the above-described mechanism to keep its position in the center of the space between the upper die 11 and the lower die 12 of the first dies 10. In this regard, in the process of pressing, the arm centerline of the preformed blank moves in the vertical direction, and specifically, the arm centerline moves in the vertical direction while being kept in the center of the space between the upper die 11 and the lower die 12 of the first dies 10. Thus, configuring the second die 20 to be movable in the vertical direction permits the arm A and the second die 20 to move vertically in the process of pressing while maintaining the positional relationship between the recess in the area As of the arm A and the second die 20. Consequently, the shape of the recess in the area As of the arm A is surely retained by the second die 20.

The excess projecting portions (Aaa, Aba) are formed around the outer peripheries of the both side portions (Aa, Ab) of the arm A of the preformed blank so as to protrude from the outer peripheries of the both side portions (Aa, Ab). On the other hand, the impressions of the first dies 10 (the upper die 11 and the lower die 12) reflect the shape of the arm A except the recess in the area As, and more specifically reflect the side portions (Aa, Ab) of the arm A. Accordingly, in the process of pressing, the impressions of the first dies 10 (the upper die 11 and the lower die 12) are pressed to the excess projecting portions (Aaa, Aba), whereby the excess projecting portions (Aaa, Aba) are bent or crushed. Thus, the excess projecting portions (Aaa, Aba) are formed into the shapes defined by the impressions of the first dies (the upper die 11 and the lower die 12). Consequently, the journal J-side surface of the arm A bulges at the side portions (Aa, Ab), and the side portions (Aa, Ab) increase in thickness.

Figure 3:
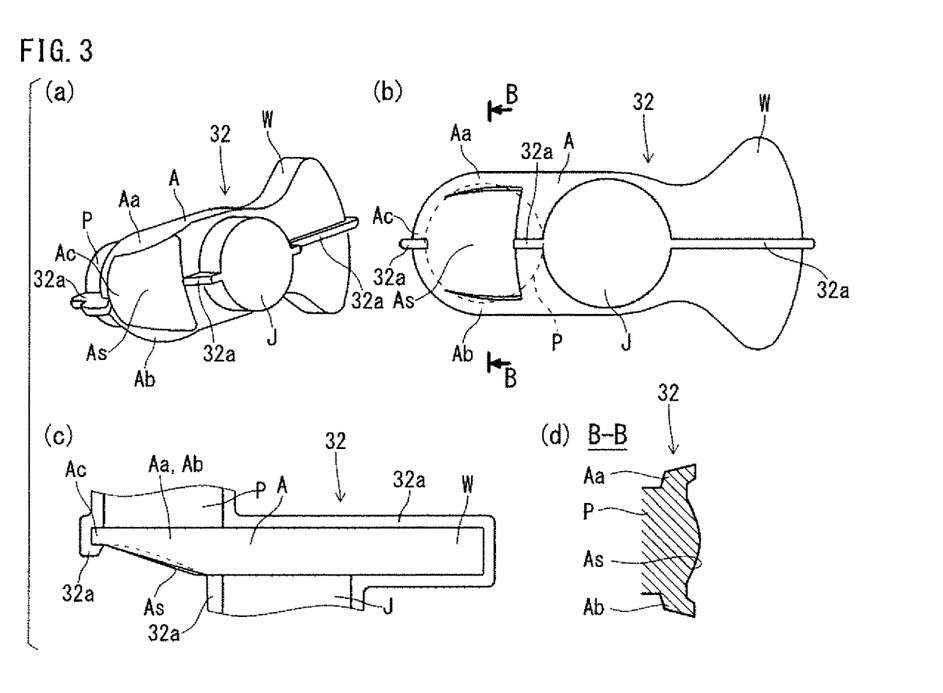
FIGS. 3(a) to 3(d) are views schematically showing an example of the shape of the arm of the crankshaft after subjected to forging according to the present invention, FIG. 3(a) being a perspective view, FIG. 3(b) being a front view seen from the side of a journal, FIG. 3(c) being a top view, and FIG. 3(d) being a sectional view along the line B-B.

The obtained in this way is a forged blank, as shown in FIG. 3, of which arm A has side portions (Aa, Ab) with increased thicknesses and has a recess in the journal J-side surface.

In the process of pressing, the second die 20 is abutted against the area As, wherein a recess is to be formed, of the journal J-side surface of the arm A and holds the area As, and thereby, the shape of the recess in the area As is stably formed.

After completion of the pressing operation of the first dies 10, the second die 20 is retracted from the arm A, and thereafter, the upper die 11 and the lower die 12 of the first dies 10 are separated from each other. Then, the crankshaft (forged blank) is taken out.

Subsequently, in the trimming step, trimming is applied to the forged blank with flash to remove the flash from the forged blank. Thereby, a crankshaft is obtained. In this regard, the shapes of the main parts (for example, the arms A, the journals J and the crank pins P) of the crankshaft obtained in the forging step are maintained in the forged blank (crankshaft) after subjected to the trimming step.

Thus, by the production method according to the present embodiment, it is possible to make a recess in the journal J-side surface of the arm A while keeping the both side portions (Aa, Ab) of the arm A thick. Therefore, the production method according to the present embodiment allows for production of a forged crankshaft having a reduced weight and sufficient stiffness.

Also, in the production method according to present embodiment, the excess projecting portions (Aaa, Aba) are formed so as to protrude locally from the outer peripheries of the side portions (Aa, Ab) of the arm A, and the excess projecting portions (Aaa, Aba) are deformed by pressing operation of the first dies 10. The force required for the pressing operation of the first dies 10 is at a comparable level with the force required for conventional forging. Meanwhile, the second die 20 is abutted against the surface of the arm A. In this regard, it is not necessary to push the second die 20 further, and the force required to support the second die 20 is small. Thus, the production method according to the present embodiment requires no large force and can be carried out in a simple manner.

Figure 1:
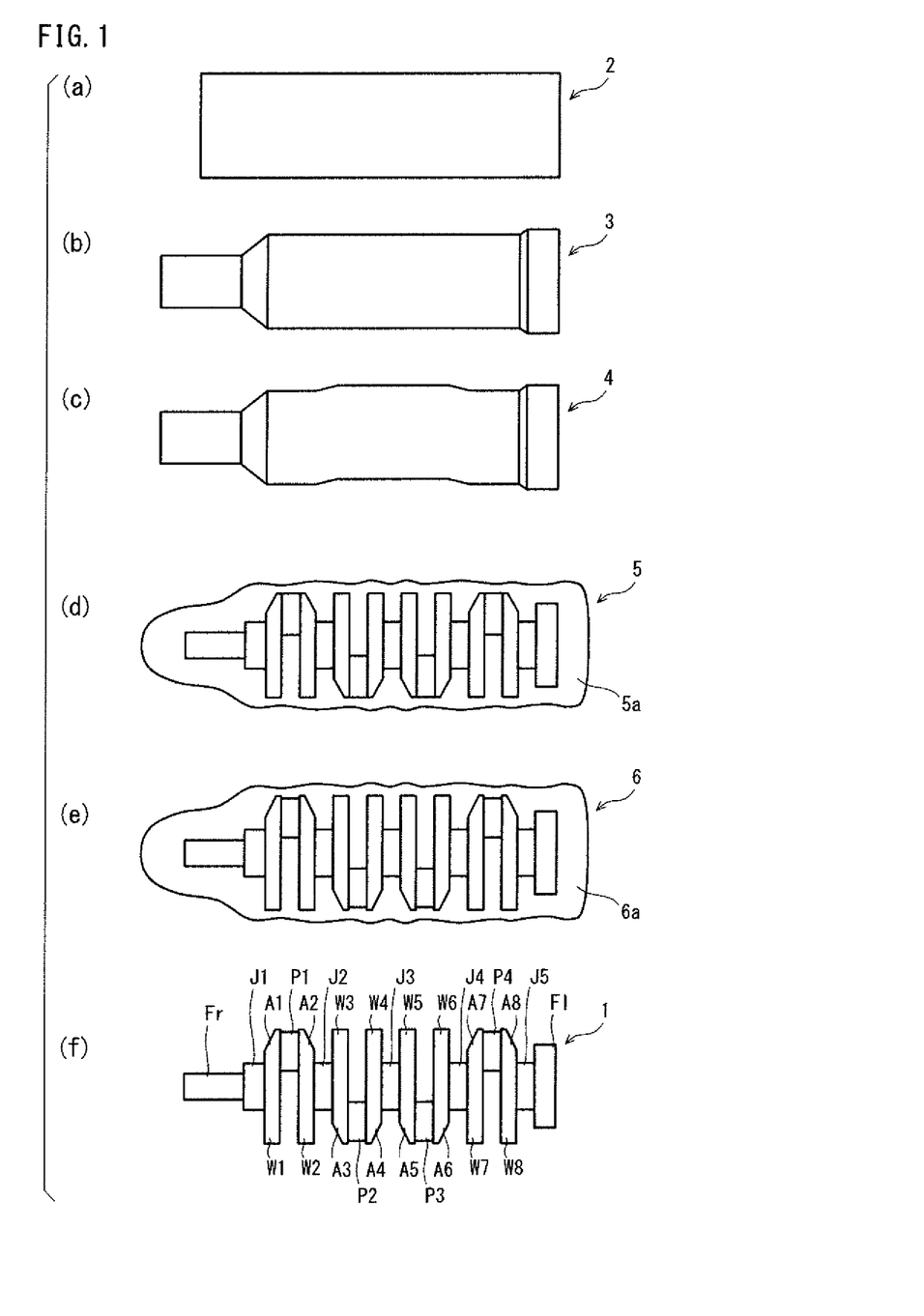
FIGS. 1(a) to 1(f) are views schematically illustrating a typical conventional process for producing a forged crankshaft, FIG. 1(a) showing a billet, FIG. 1(b) showing a rolled blank, FIG. 1(c) showing a bent blank, FIG. 1(d) showing a block forged blank, FIG. 1(e) showing a finish forged blank, and FIG. 1(f) showing a crankshaft.

In the conventional production method as illustrated in FIG. 1, press forging is carried out by use of a pair of dies in a block forging step and in a finish forging step, and the forged blanks obtained by the respective forging steps have large flash. In the production method according to the present embodiment, on the other hand, a preformed blank with no flash is obtained in the preforming step, and a forged blank with flash is obtained in the die forging step. However, the flash formed in the die forging step is small. As seen in FIGS. 3(a) to 3(d) and FIG. 5(b), the second die is abutted against a portion of the forged blank 32 (the blank after subjected to die forging), the flash 32a is not formed at the portion of the forged blank. Accordingly, the production method according to the present embodiment allows for an improvement in yield.

In the production method according to the present embodiment, in the die forging step, the blank is shaped while flash is formed, and excess material that flows out of the impressions of the first dies 10 (the upper die 11 and the lower die 12) to be formed into the flash may flow into a space between the first dies 10 and the second die 20. This may cause breakage of the first dies 10 and/or the second die 20. Also, this may prevent the second die 20 from moving forward and backward, which may result in stoppage of operation.

In order to prevent these problems, the second die 20 preferably has a guide groove 20a so that the excess material to be formed into the flash can be guided through the guide groove 20a. For example, in the second die 20 illustrated in FIGS. 4 and 5, the guide groove 20a with a predetermined width is formed such that the center of the width matches with the portion of the second die 20 to be positioned in the center of the space between the upper die 11 and the lower die 12 of the first dies 10. Thus, the excess material to be formed into the flash around the blank is guided through the guide groove 20a without flowing into the space between the first dies 10 (the upper die 11 and the lower die 12) and the second die 20.

The shape and the size of the guide groove 20a may be designed according to the size of the flash to be formed. For example, the guide groove 20a may have a rectangular, trapezoidal or semicircular cross-sectional shape.

In the pressing operation in the die forging step, it is preferred that the second die 20 is moved in the pressing direction so as to be positioned in the center of the space between the upper and the lower dies of the first dies 10. Thereby, the shapes of the recess to be formed in the area As of the arm A are surely maintained by the second die 20, and the working accuracy in the area against which the second die 20 abutted can be improved. As the mechanism for moving the second die 20 in the pressing direction, the above-described mechanism can be used, that is, the mechanism for moving the second die 20 in the pressing direction may include a holder, a first elastic component and a second elastic component.

Meanwhile, in a crankshaft, stress concentration is likely to occur in pin fillet portions that are joint portions between crank pins P and arms A. In many cases, therefore, quenching by high-frequency induction heating is applied to the pin fillet portions in order to improve the fatigue strength. In this regard, pin top portions Ac of the respective arms A are adjacent to the pin fillet portions to be subjected to quenching, and unless the pin top portions Ac are sufficiently thick, quenching cracks may occur therein.

It is preferred that the pin top portions Ac of the arms A are formed into thick shapes in the preforming step and that the thick shapes are maintained even after the die forming step. Then, the produced crankshaft has sufficiently thick pin top portions Ac. Alternatively, the pin top portions Ac do not need to be formed into thick shapes in the preforming step, and the pin top portions Ac may be formed into thick shapes in the die forging step. In this case also, the produced crankshaft has sufficiently thick pin top portions Ac. By ensuring formation of thick pin top portions Ac, the resistance to quenching cracks can be improved.

The production method according to the present embodiment is intended not only for an arm having a weight integrated therewith as illustrated in FIGS. 2(a) to 2(d) and 3(a) to 3(d) but also for an arm having no weight integrated therewith. Specifically, in the above-described 4-cylinder 8-counterweight crankshaft, every arm of the crankshaft has a weight integrated therewith. In this case, with regard to each and every one of the arms, excess projecting portions may be formed on the both side portions, near a crank pin, and the excess projecting portions may be deformed so as to increase the side portions in thickness.

In the above-mentioned 4-cylinder 4-counterweight crankshaft, some arms of the crankshaft each have a weight integrated therewith. In this case, only with regard to the arms having a weight, excess projecting portions may be formed on the both side portions, near a crank pin, and the excess projecting portions may be deformed so as to increase the side portions in thickness. Alternatively, with regard to any of the arms, whether it has a weight integrated therewith or no weight integrated therewith, excess projecting portions may be formed on the both side portions, near a crank pin, and the excess projecting portions may be deformed so as to increase the both side portions in thickness.

The production process according to the present embodiment is applicable not only to a crankshaft to be mounted in a 4-cylinder engine but also to crankshafts that are to be mounted in a 3-cylinder engine, an inline 6-cylinder engine, a V-type 6-cylinder engine, an 8-cylinder engine, and the like.

INDUSTRIAL APPLICABILITY

The present invention is effectively used for manufacture of forged crankshafts to be mounted in any kind of reciprocating engines.

REFERENCE SIGNS LIST

1: forged crankshaft
J, J1 to J5: journal
P, P1 to P4: crank pin
Fr: front portion
Fl: flange
A, A1 to A8: crank arm
W, W1 to W8: counterweight
Aa, Ab: side portion of arm
Ac: pin top portion of arm
As: area of journal-side surface of arm, inward from side portions
Aaa, Aba: excess projecting portion
10: first dies
11: upper die
12: lower die
20: second die
20a: guide groove 31: blank before subjected to die forging
32: blank after subjected to die forging (forged blank)
32a: flash

The invention claimed is:

1. A method for producing a forged crankshaft, the crankshaft including: journals that define a center of rotation; crank pins that are eccentric with respect to the journals; and crank arms, each of the crank arms connecting a corresponding one of the journals to a corresponding one of the crank pins, the method comprising:
- a preforming step of forming a preformed blank with no flash, the preformed blank including a shape of the crankshaft, wherein the crank arm has an excess projecting portion at an outer periphery of each of side portions near the crank pin, the excess projecting portion projecting from the outer periphery;
- a die forging step of forming a forged blank with flash by pressing the preformed blank formed in the preforming step with a pair of first dies; and
- a trimming step of removing the flash from the forged blank formed in the die forging step, wherein:
- in the die forging step, while a second die is abutted against an area in a surface of the crank arm to hold the area, the surface being adjacent to the journal, the area not including areas of the side portions of the preformed blank, deforming the excess projecting portions of the crank arm by the first dies so as to increase the side portions of the crank arm in thickness.

2. The method for producing a forged crankshaft according to claim 1, wherein
the second die includes a guide groove so that excess material flowing out to be formed into the flash during the pressing in the die forging step is guided through the guide groove.

3. The method for producing a forged crankshaft according to claim 1, wherein
during the pressing in the die forging step, the second die is moved in a pressing direction such that the second die is positioned in a center of a space between the paired first dies.

4. The method for producing a forged crankshaft according to claim 2, wherein
during the pressing in the die forging step, the second die is moved in a pressing direction such that the second die is positioned in a center of a space between the paired first dies.

5. The method for producing a forged crankshaft according to claim 1, wherein
every crank arm of the crankshaft has a counterweight.

6. The method for producing a forged crankshaft according to claim 5, wherein
with regard to each and every one of the crank arms, the side portions of the crank arm increase in thickness.

7. The method for producing a forged crankshaft according to claim 1, wherein
some crank arms of the crankshaft each have a counterweight.

8. The method for producing a forged crankshaft according to claim 7, wherein
only with regard to the crank arms having the counterweight, the side portions of the crank arm having the counterweight increase in thickness.

* * * * *